(12) United States Patent
Allemann et al.

(10) Patent No.: US 6,926,477 B2
(45) Date of Patent: Aug. 9, 2005

(54) JIG ASSEMBLY

(75) Inventors: Markus Allemann, Grayslake, IL (US); Robert K. Kopras, Black Earth, WI (US); Al Uzumcu, Vernon Hills, IL (US); Scott Adler, Madison, WI (US)

(73) Assignee: Credo Technology Corporation, Broadview, IL (US)

( * ) Notice: Subject to any disclaimer, the term of this patent is extended or adjusted under 35 U.S.C. 154(b) by 27 days.

(21) Appl. No.: 10/664,034

(22) Filed: Sep. 16, 2003

(65) Prior Publication Data

US 2004/0126197 A1 Jul. 1, 2004

Related U.S. Application Data

(60) Provisional application No. 60/411,129, filed on Sep. 16, 2002.

(51) Int. Cl.$^7$ .............................. B23C 1/20; B23C 9/00
(52) U.S. Cl. ...................... 409/130; 409/182; 409/180; 409/178; 144/144.51; 144/144.1; 144/145.3; 144/253.3; 144/136.95; 33/563; 33/566; 33/638
(58) Field of Search .................. 409/130, 178–182, 409/125; 144/144.52, 253.3, 136.95, 154.5, 371, 145.3, 137, 144.1, 144.51; 33/562–565, 566, 638, 628

(56) References Cited

U.S. PATENT DOCUMENTS

| | | | | | |
|---|---|---|---|---|---|
| 3,581,787 A | * | 6/1971 | Bane | ........................ | 144/154.5 |
| 4,274,459 A | * | 6/1981 | Galajda | .................... | 144/144.1 |
| 4,281,694 A | * | 8/1981 | Gorman | .................... | 144/154.5 |
| 4,353,672 A | * | 10/1982 | Smith | ......................... | 409/130 |
| 4,595,040 A | * | 6/1986 | Glisman | ..................... | 409/130 |
| 4,652,191 A | * | 3/1987 | Bernier | ....................... | 409/182 |
| 4,992,011 A | * | 2/1991 | Cesark | .................... | 144/145.3 |
| 5,027,523 A | * | 7/1991 | MacLeod | ..................... | 33/566 |
| 5,040,580 A | * | 8/1991 | Hufford | .................... | 144/144.1 |
| 5,383,503 A | * | 1/1995 | Johnson | ................. | 144/144.51 |
| 5,613,811 A | * | 3/1997 | Tillemans | .................... | 409/130 |
| 5,893,402 A | * | 4/1999 | Darling | ...................... | 409/130 |
| 6,112,425 A | * | 9/2000 | Nelson et al. | ................ | 33/563 |
| 6,443,675 B1 | | 9/2002 | Kopras et al. | | |
| 6,694,635 B1 | * | 2/2004 | Sidebottom | .................. | 33/638 |
| 2002/0095810 A1 | * | 7/2002 | Carlson et al. | ............... | 33/562 |
| 2003/0115767 A1 | * | 6/2003 | Wedekind et al. | ............ | 33/566 |

FOREIGN PATENT DOCUMENTS

| JP | 4-368803 A | * 12/1992 |
|---|---|---|
| WO | WO 02/04182 A1 | 1/2002 |

OTHER PUBLICATIONS

Dremel Operating/Safety Instructions–Model 335 Plunge Router Attachment, Dremel Division of Robert Bosch Tool Corporation, 36 pages.

963–01 Plunge Router Attachment Product Description, Copyright 2003, Robert Bosch Tool Corporation, 2 pages.

* cited by examiner

*Primary Examiner*—Erica Cadugan
(74) *Attorney, Agent, or Firm*—Foley & Lardner LLP

(57) ABSTRACT

A jig assembly for use with work piece and a hand-held power tool having a cutting bit includes a first member and at least one insert. The first member has a first opening and is configured to be positioned adjacent a first side of the work piece. The at least one insert is configured to fit within the first opening in the first member and includes a second opening. At least one of the first opening and second opening is configured to allow a portion of the hand-held power tool to pass therethrough to contact the work piece and to act as a guide for the hand-held power tool as it removes material from the work piece.

28 Claims, 14 Drawing Sheets

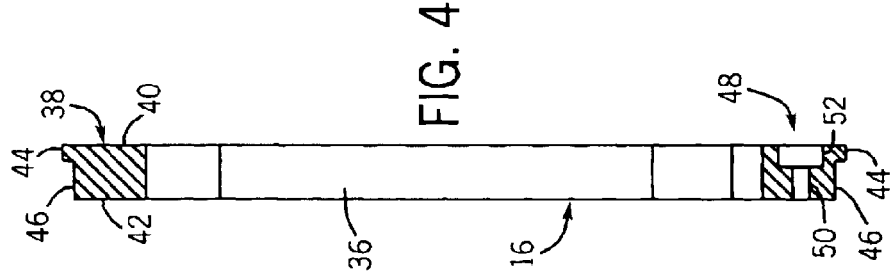
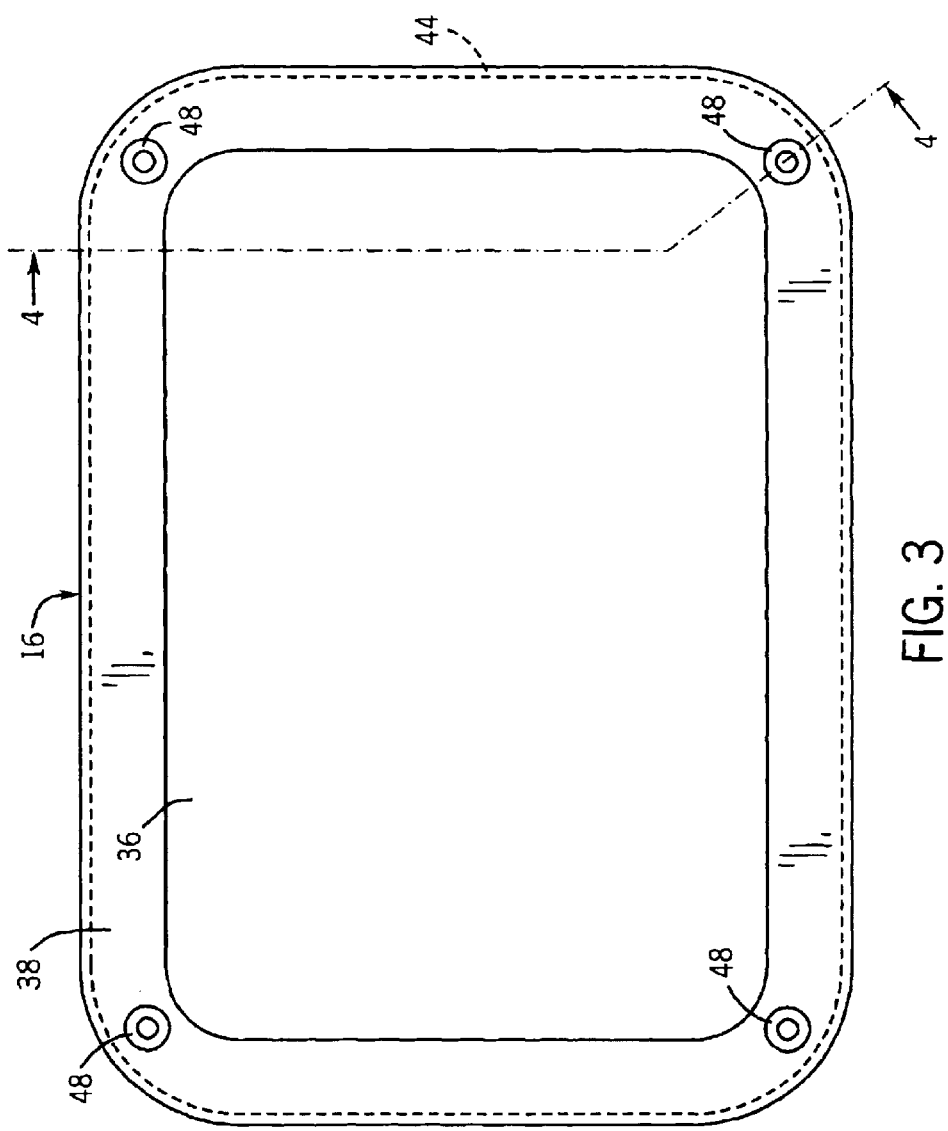

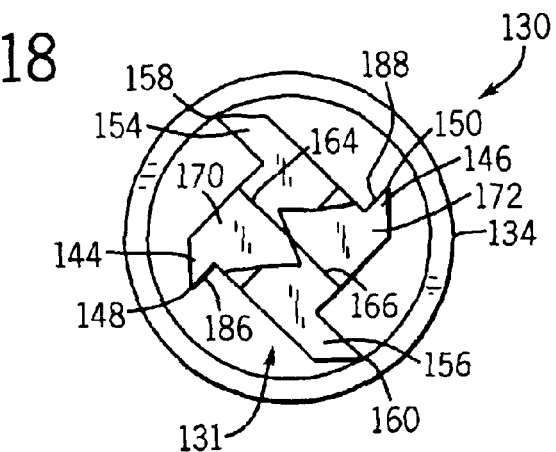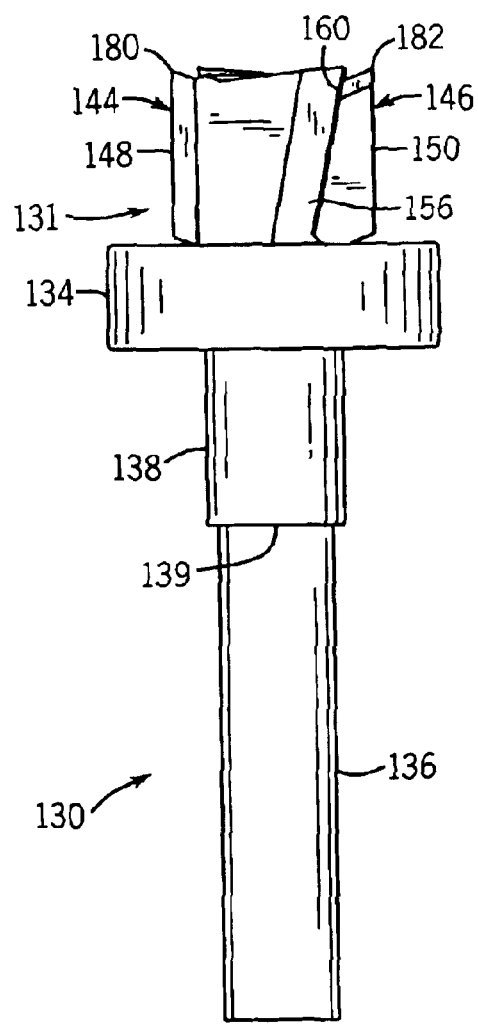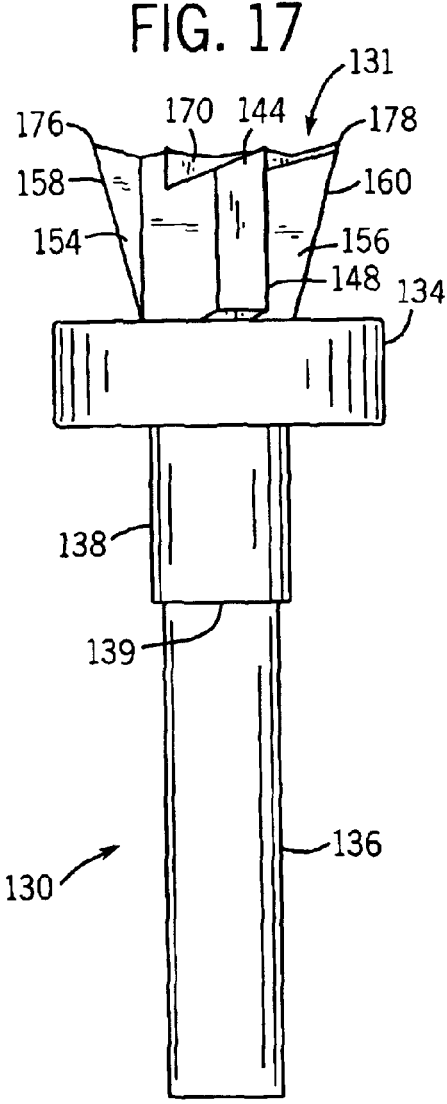

JIG ASSEMBLY

CROSS REFERENCE TO RELATED APPLICATIONS

This application claims the benefit of U.S. Provisional Application No. 60/411,129, titled "Improved Cutting Bits for Forming Picture Frame," filed Sep. 16, 2002, which is hereby incorporated by reference.

BACKGROUND OF THE INVENTION

The present invention relates generally to the field of jig assemblies and cutting bits for use with power tools and, more specifically, to jig assemblies and cutting bits adapted for use with hand-held power tools.

BRIEF DESCRIPTION OF THE DRAWINGS

FIG. 3 is a top view of an insert guide adapted for use with the jig assembly;

FIG. 4 is a cross sectional view of an insert guide taken along lines 4—4 of FIG. 3;

FIG. 16 is a front elevational view of a first embodiment of a router bit according to the invention;

FIG. 17 is a side elevational view of the router bit seen in FIG. 16;

FIG. 18 is a top view of the router bit seen in FIG. 16;

DETAILED DESCRIPTION OF THE PREFERRED EMBODIMENTS

Figure 1:
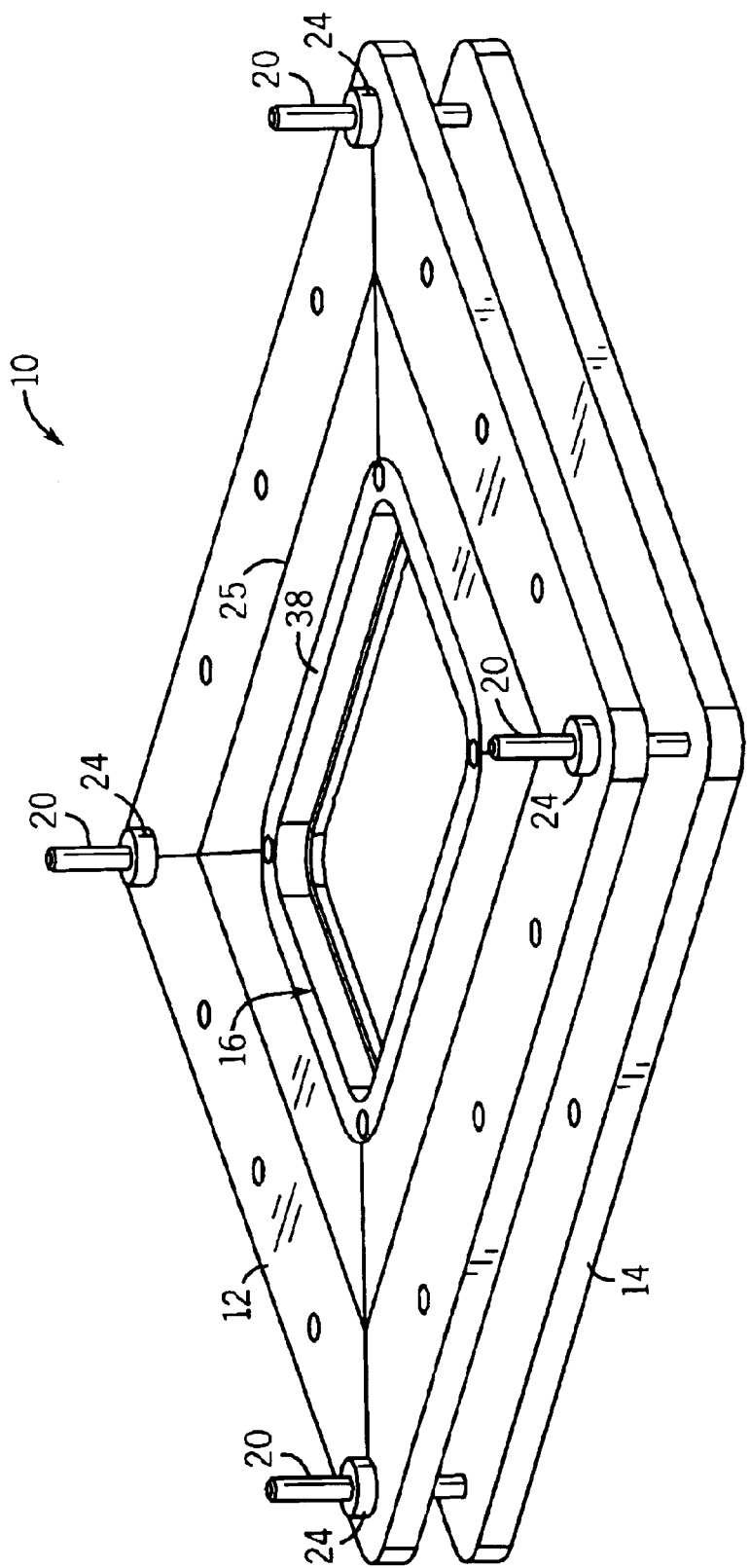
FIG. 1 is a perspective view of a preferred embodiment of a jig assembly in the fully assembled condition.
Figure 2:
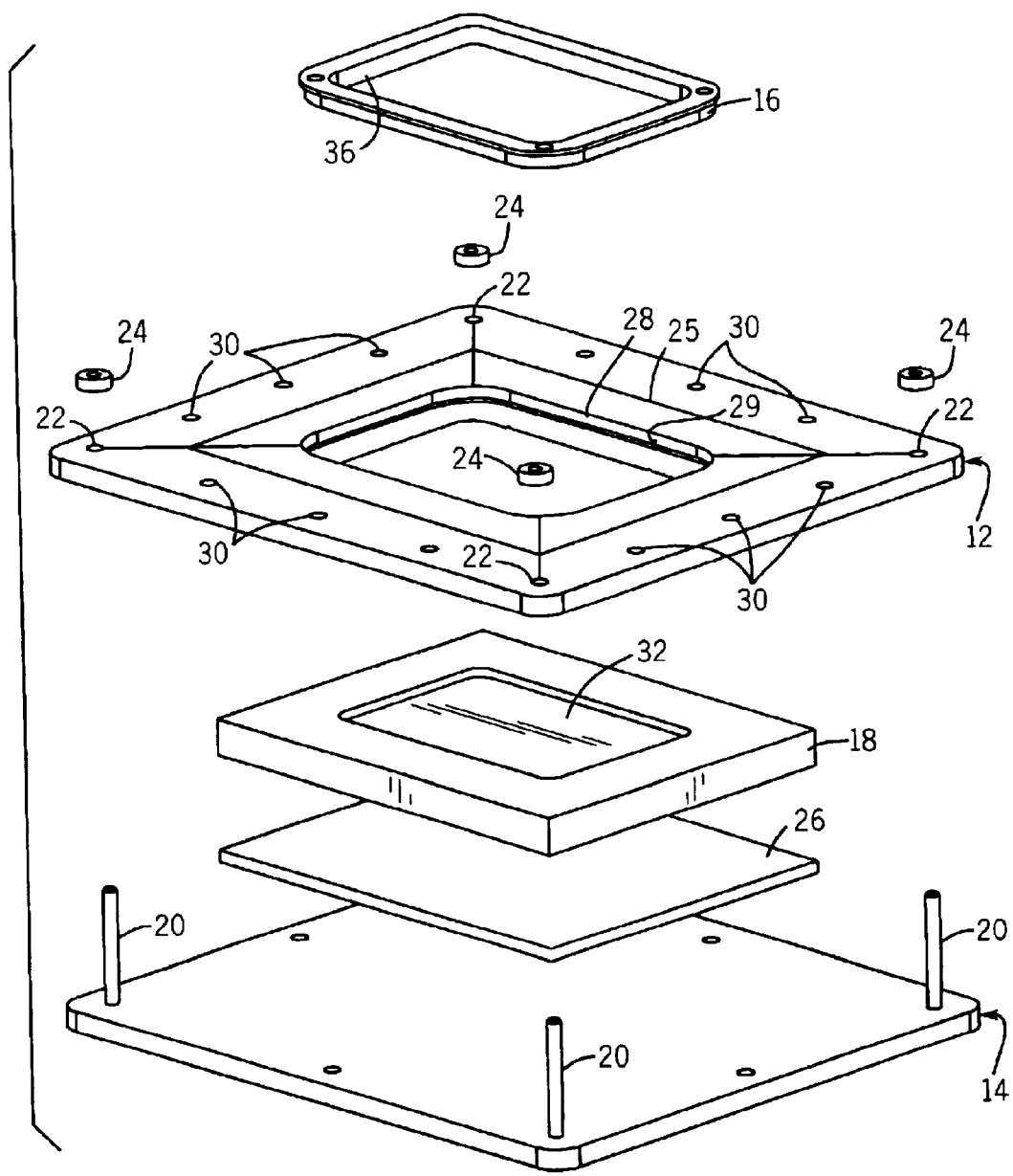
FIG. 2 is an exploded perspective view of the jig assembly of FIG. 1 and a work piece.

Referring to FIGS. 1 and 2, a jig assembly 10 is shown. In its preferred embodiment, the assembly 10 comprises a top member or plate 12, a bottom member or plate 14, and a tool guide or insert guide 16. A work piece 18 is preferably positioned between the top plate 12 and the bottom plate 14. Means for clamping the top plate 12 to the bottom plate 14 are provided and these means preferably comprise a plurality fasteners, shown as bolts 20, arranged around the perimeter of the bottom plate 14; however, other conventional clamping means such as an over-center latch mechanism can be utilized. The bolts 20 extend through suitably sized and positioned apertures 22 formed in the top plate 12. Nuts 24 are adapted to be received on the ends of the bolts 20 and are dimensioned so that the nuts 24 will not pass through the apertures 22.

Preferably, the top plate 12 is formed from a clear, rigid material such as a clear polycarbonate. Forming the top plate 12 from a clear material allows the user to observe the position of the work piece 18 in relation to the top and bottom plates 12, 14. In addition, the top plate 12 preferably includes alignment lines 25 formed thereon so that the user can confirm the alignment of the work piece 18 within the jig assembly 10. A no-skid pad 26 or other means for resisting movement of the work piece 18 between the two plates 12, 14 is preferably provided on the top surface of the bottom plate 14. According to alternative embodiments, the no-skid pad may also be, or may alternatively be, provided on the bottom surface of the top plate. In the preferred embodiment, the pad 26 is formed of a rubber material, such as neoprene.

Figure 7:
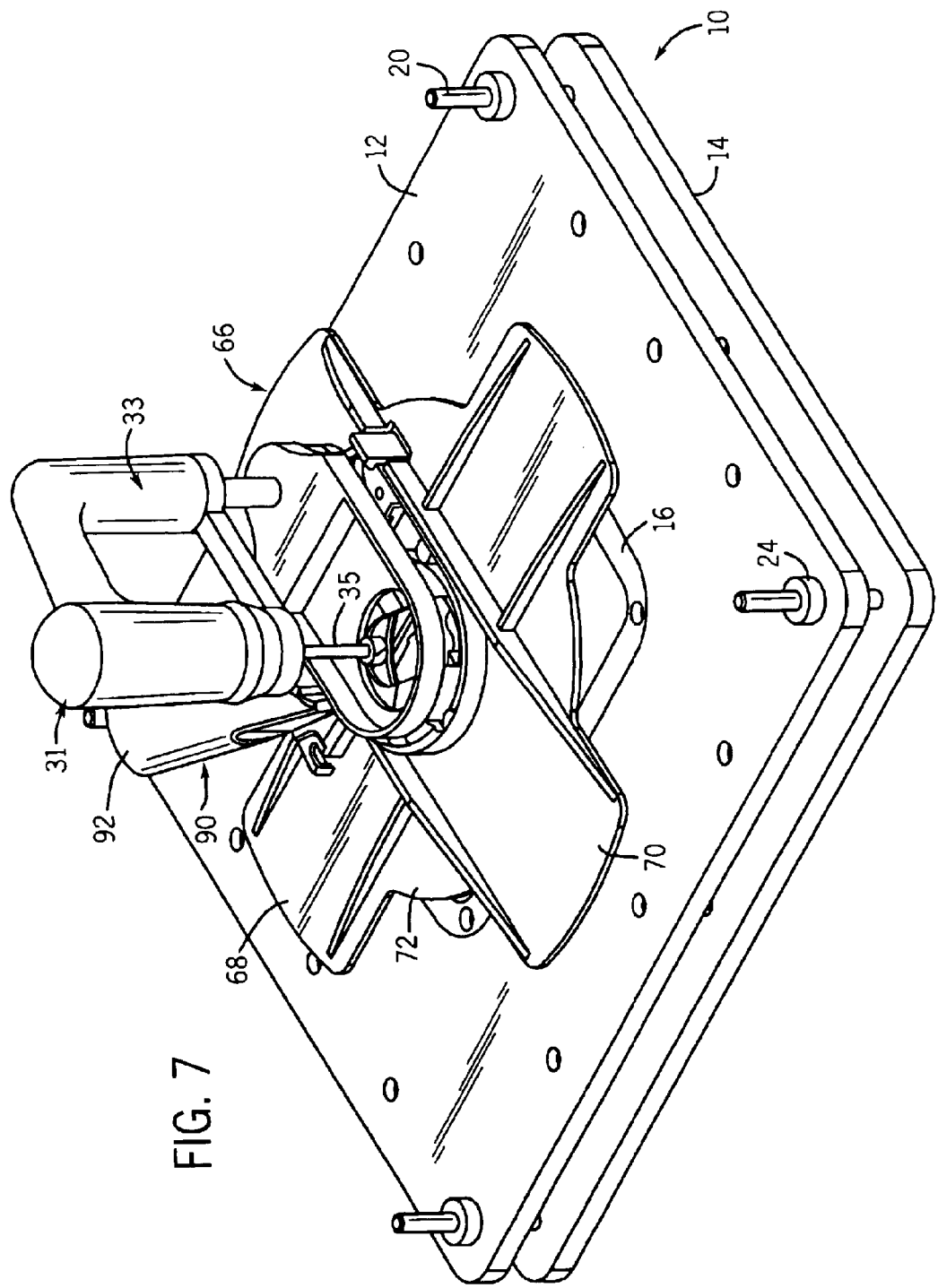
FIG. 7 is a perspective view of a power tool, cutting bit, and plunge router attachment shown coupled to the tool sub-base, dust collector, and jig assembly of FIG. 6.

Referring now to FIG. 7, a recess or opening 32 (e.g., picture frame opening, etched area, recessed area, engraved area, carved area, etc.) is preferably formed in the work piece 18 through the use of a conventional hand-held power tool 31 incorporating a bit 35, which may be a router bit or one of a variety of other types of bits configured to remove material from the work piece 18 (such as bits 130 and 200 described below, for example). Hand-held power tool 31 may be one of a variety of different tools including conventional routers, rotary tools, or cut-out tools capable of utilizing one of a variety of different bits. For example, hand-held power tool 31 may be a commercially available Roto Zip® tool or a Dremel® rotary tool. In the preferred embodiment of this invention, a Roto Zip® tool or Dremel® rotary tool incorporating a plunge router attachment 33 is utilized in conjunction with the bit 35 to form the opening 32. A complete description of a Roto Zip® tool suitable for use with the invention is found in U.S. patent application Ser. No. 09/506,244, filed Feb. 17, 2000, which is expressly incorporated herein by reference. A plunge router attachment adapted for use with the Roto Zip® tool and the jig assembly is described in P.C.T. Patent Application Publication No. WO-02/04182, filed Jul. 11, 2001, which is also expressly incorporated herein by reference.

Plunge router or plunge router attachment 33 is a mechanism or device that generally controls the movement of the tool 31 and the bit 35 relative to the support base of the plunge router 33, which generally contacts the work piece 18. In the configuration illustrated in FIG. 7, plunge router 33 controls the movement of the bit 35 into and out of the work piece 18. To control movement of the bit 35, the plunge router 33 is coupled to the tool 31 and provides a structure that allows a user of the plunge router 33 to maintain the tool 31 and the bit 35 in a spaced relationship with the support base of the plunge router 33 (and therefore with the work piece 18).

According to a preferred embodiment, the plunge router 33 has an automatic or locking plunge base that allows a user to select a desired position or spatial relationship and then automatically lock the tool 31 into the appropriate position by simply pushing the tool 31 into the desired position.

According to one exemplary embodiment, the plunge router includes a base, a support structure, and two support shafts. The base is a generally flat member or panel that is configured to slide along or otherwise contact the work piece. The support structure is configured to receive and support the tool 31 and is coupled to the base by two support shafts. The two shafts extend through the support structure and allow the support structure (and the tool 31 coupled to the support structure) to be moved along the shafts toward and away from the base. By moving the support structure and tool 31 along the shafts, a user can alter and substantially control the location of the bit 35 relative to the work piece. The position of the support structure along the two shafts can be locked (for example, by set screws or other fasteners) to maintain the bit 35 in a specific position with respect to the work piece. The base includes an opening that allows the bit 35, a portion of the tool 31, and/or a portion of the support structure to pass through the base as the support member, the tool 31, and the bit 35 are moved toward the work piece. To prevent the bit 35 from contacting the components of the jig assembly or other templates that may be used with the plunge router, a bushing (e.g., guide bushing, tube, etc.) that extends below the bottom surface of the base may be coupled to the base proximate the opening. When coupled to the base, the bushing at least partially surrounds the bit and is intended to hamper the ability of the bit to contact any portion of the jig assembly or template. The bushing may be removed from the base of the plunge router when it is not needed, such as when the plunge router is not being used with the jig assembly or with other templates. Because the bushing may be coupled to the plunge router, the plunge router (and tool 31) may be used with any one of a wide variety of conventional router bits 35. One embodiment of the plunge router is the Model 335 Plunge Router Attachment commercially available from Dremel®. Another embodiment of the plunge router is Plunge Router Attachment part no. 963-01, which is also commercially available from Dremel®.

According to various alternative embodiments, the plunge router may have any of a wide variety of configurations and may be configured to couple to one or more of a variety of different hand-held power tools. According to other alternative embodiments, the plunge router may be configured to maintain a single spaced relationship, may be adjusted to provide variable spaced relationships, and/or may employ any one or more of a variety of different locking and/or adjustment mechanisms to lock, release, or adjust the position of the plunge base relative to the tool 31 or bit 35. Moreover, the plunge base may be permanently coupled to the tool or may be releaseably coupled to the tool.

When the cut-out tool 31 and bit 35 are mounted to the plunge router 33, the bit 35 is adapted for movement between a retracted position and an extended or cutting position. The tool 31 is adapted to be positioned above the central opening 28 of the top plate 12 and then moved toward the central opening 28 so that the bit 35 plunges into the work piece 18 in the area defined by the central opening 28. In practice, the user moves the tool 31 back and forth across the central opening 28 cutting the work piece 18 until enough material from the work piece 18 has been removed by the bit 35 to create the desired recess or opening 32.

As seen in FIGS. 1–2, the top plate 12 has an opening 28 formed in the central portion thereof. This opening 28 is adapted to selectively receive an insert for guiding the shape of a recess or opening. According to one exemplary embodiment, the dimensions of the central opening 28 of the top plate 12 are slightly larger than 5 inches by 7 inches and take into account the fact that the cutting edge(s) of some bits 35 may not be able to reach an area of the work piece 18 directly below the edges of opening 28 due to various guides and bearings that may be provided on the tool, tool attachments, and/or bits to prevent the bit from contacting one or more of the components of the jig assembly 10. This size is suitable for creating an opening for use as a picture frame for a traditional 5×7 inch photograph. According to other exemplary embodiments, the opening may have one of a variety of different shapes and be one of a variety of different sizes depending on the particular application or applications for which the jig assembly is desired to be used. In operation, the user can mount insert guide 16 inside the central opening 28 of the top plate 12 to create a desired shape or configuration or, can remove the insert guide 16 and instead use the central opening 28 to create a desired shape or configuration, such as a 5×7 picture frame opening. To assist in aligning the insert guide 16 in the opening 28, top plate 12 includes a recess 29 around the opening 28 that is configured to receive a shoulder or flange 44 provided on the insert guide 16. The depth of the recess 29 is approximately equal to the thickness of the shoulder 44 on the insert guide 16 and allows the top surface of the top plate 12 to be substantially co-planar with the top surface of the insert guide 16. According to various alternative embodiments, various other structures may be used to align the insert guide in the opening of the top plate.

In addition to the central opening 28 and the bolt apertures 22, the top plate 12 preferably includes several other apertures 30 spaced around the periphery thereof. These mounting apertures 30 are useful when the top plate 12 is used independently of the bottom plate 14. In certain applications, it would be desirable to remove the top plate 12 from the bottom plate 14 and instead mount the top plate 12 directly to the work piece. Conventional fasteners, for example screws, can be inserted through one or more of the mounting apertures 30 for fixably securing the top plate 12 to an oversized work piece. For example, if the user desired to cut a picture frame opening, or to carve, inscribe, cut, etch, or engrave lettering or other shapes, into a large block of wood such as a fireplace mantel, the top plate 12 can be mounted to this large piece of wood by screws passing through the mounting apertures 30. The user can then cut the desired recesses or openings with the tool 31 (used in conjunction with the appropriate bit 35) and then remove the top plate 12 from the oversized work piece. After removal of the top plate 12, the user can fill in any holes that the mounting screws may have created in the work piece. With a system such as this, recesses or openings can be formed in any number of work pieces including but not limited to fireplace mantels, doors, counter tops, Corian® slabs and the like.

In some cases, it may not be practicable to use potentially destructive fasteners such as screws for mounting the top plate 12 to a work piece. Therefore, alternative-fastening means can be used, such as adhesives, velcro and the like. Mechanical fasteners, such as C-clamps, can also be employed under certain circumstances for securing the top plate 12 to a work piece, independently from the bottom plate 14.

One example of an insert guide 16 according to the invention is shown in FIGS. 3–4. The insert is preferably formed of a clear, rigid material, such as a clear polycarbonate, and comprises a central opening 36 formed in a substantially planar member. The body 38 of the insert guide has a top surface 40 and a bottom surface 42. A shoulder, flange, or projection 44 extends outwardly from an outside edge 46. The shoulder 44 is configured to engage the recess 29 of the top plate 12 and helps to properly align the insert guide 16 with the top plate 12.

As seen in FIGS. 3–5H, the insert guides preferably incorporate mounting apertures 48 for directly mounting the guide to a work piece. While it is preferable that both the top plate 12 and guide would be used in conjunction with one another in forming the recess or opening, in some circumstances, it will not be feasible to include the top plate 12. Under these circumstances, just the insert guide can be mounted to the work piece for creation of a recess, opening, or the like.

The apertures 48 preferably have a counterbore or countersink, with a first diameter opening 50 adapted to receive the shaft of the mounting screw and a second diameter opening 52, larger than the first, adapted to receive the head of a mounting screw. By incorporating this larger diameter opening or recess in the body 38 of the insert, the head of mounting screws used with the insert guide 16 will not extend above the top surface 40 of the guide and potentially interfere with the power tool used to form the recess or opening.

The central opening 36 of the particular insert guide 16 seen in FIG. 3 is dimensioned so that the user of the invention can create a 4 inch by 6 inch opening or recess in the work piece (a common size for photographs) to serve as a picture frame for a photograph. As seen in FIGS. 5A–5H, an unlimited number of different recesses, openings or configurations can be formed in the work piece 18 through the use of insert guides having one or more central openings that are different shapes and/or sizes. For example, FIGS. 5A–5H show a large diameter oval insert guide 56; a small diameter oval guide 58; a heart-shaped guide 60; a circle-shaped guide 62; a guide 57 having openings in the shape of one or more letters of the alphabet; a guide 59 having openings in the shape of a star, a triangle, a flag, an arrow, a half moon, a lightening bolt, and a wavy line; a guide 61 having openings in the shape of one or more numbers and common symbols; and a solid guide 63 that allows a user to create an opening or openings of his or her own design. To create the opening in solid guide 63, the user may use the tool 31 with the appropriate cutting bit 35 and remove material from the guide 63 in a freehand fashion in much the same way the user would remove material from any other work piece where a template or guide is not available or desired. Other guides may include openings depicting seasonal figures or figures associated with certain holidays, animals, fruit, vegetables, cars, books, and countless other objects and shapes.

Figure 5B:
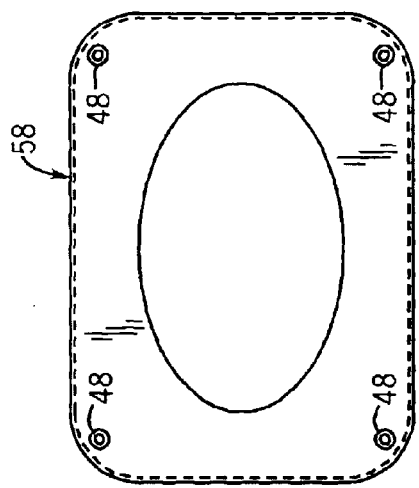
FIGS. 5A–5H are top views of several different insert guides showing alternative shapes for the opening.
Figure 5D:
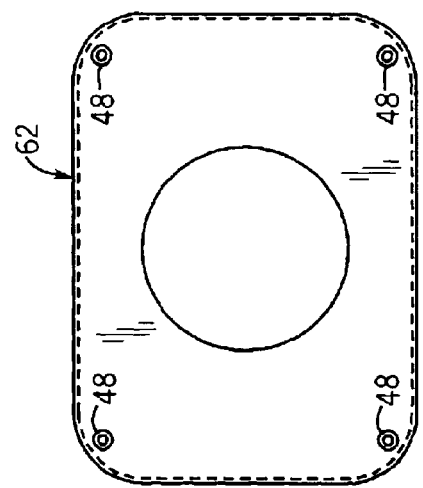
Figure 5A:
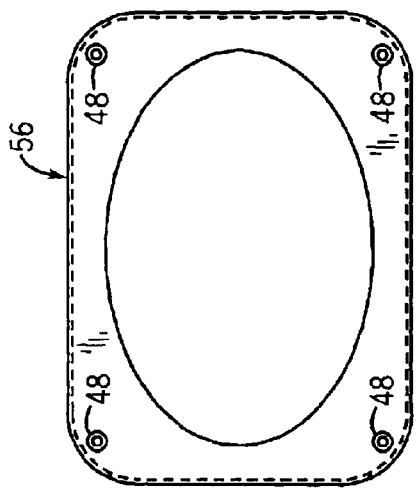
Figure 5C:
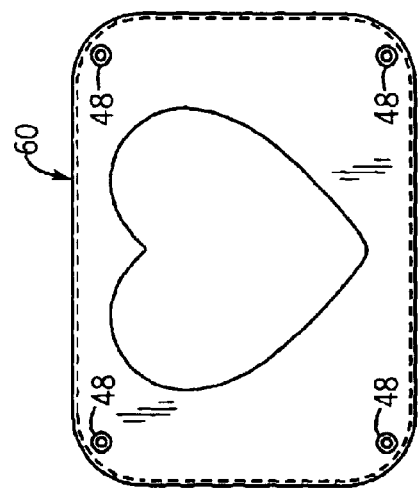
Figure 5E:
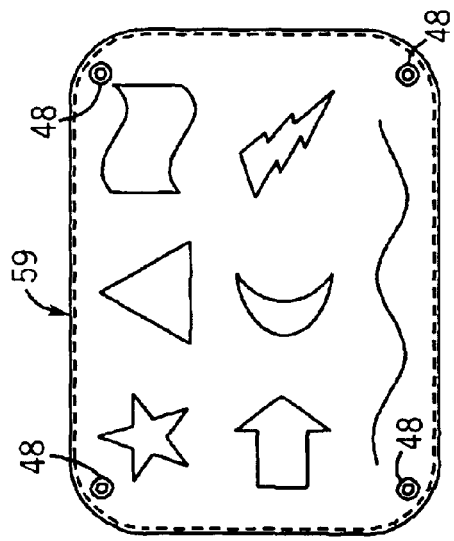
Figure 5F:
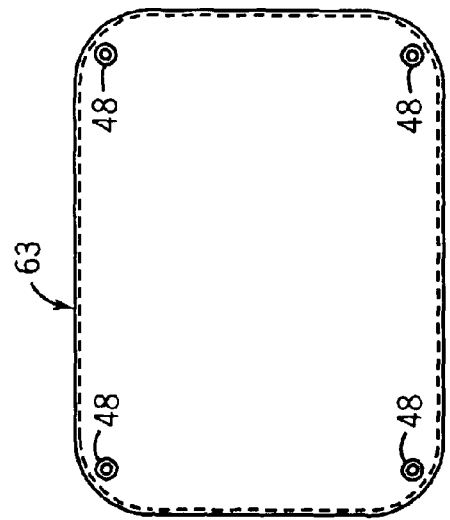
Figure 5G:
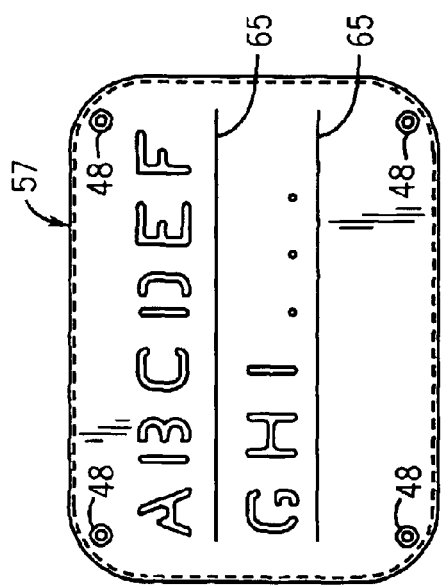
Figure 5H:
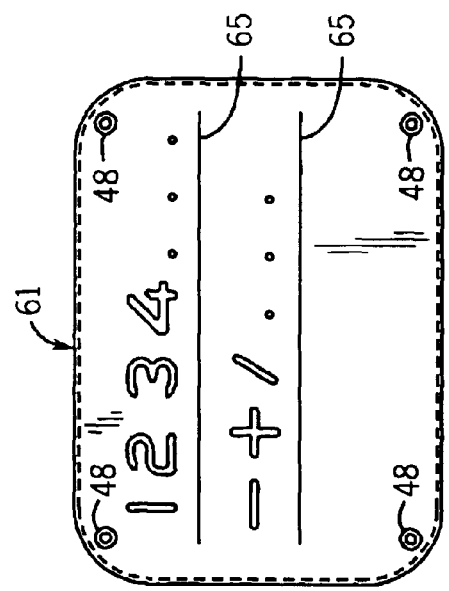

To assist the user in aligning different letters, numbers, symbols, and/or other shapes that he or she may wish to engrave or cut into the work piece, the inserts may include alignment lines, such as lines 65 illustrated in FIGS. 5E and 5G. According to various alternative embodiments, the inserts may include one or more openings that are suited for various purposes and applications. For example, one insert may include an opening that is suitable for creating a picture frame. Another insert may include one or more openings that are suitable for use in engraving or inscribing decorative images into the work piece, or for inscribing or engraving labels into various objects. Applicant has identified only a few of the many varied and unlimited numbers of shapes that can be adapted for use with the invention and only a few of the possibilities are depicted herein.

Figure 8:
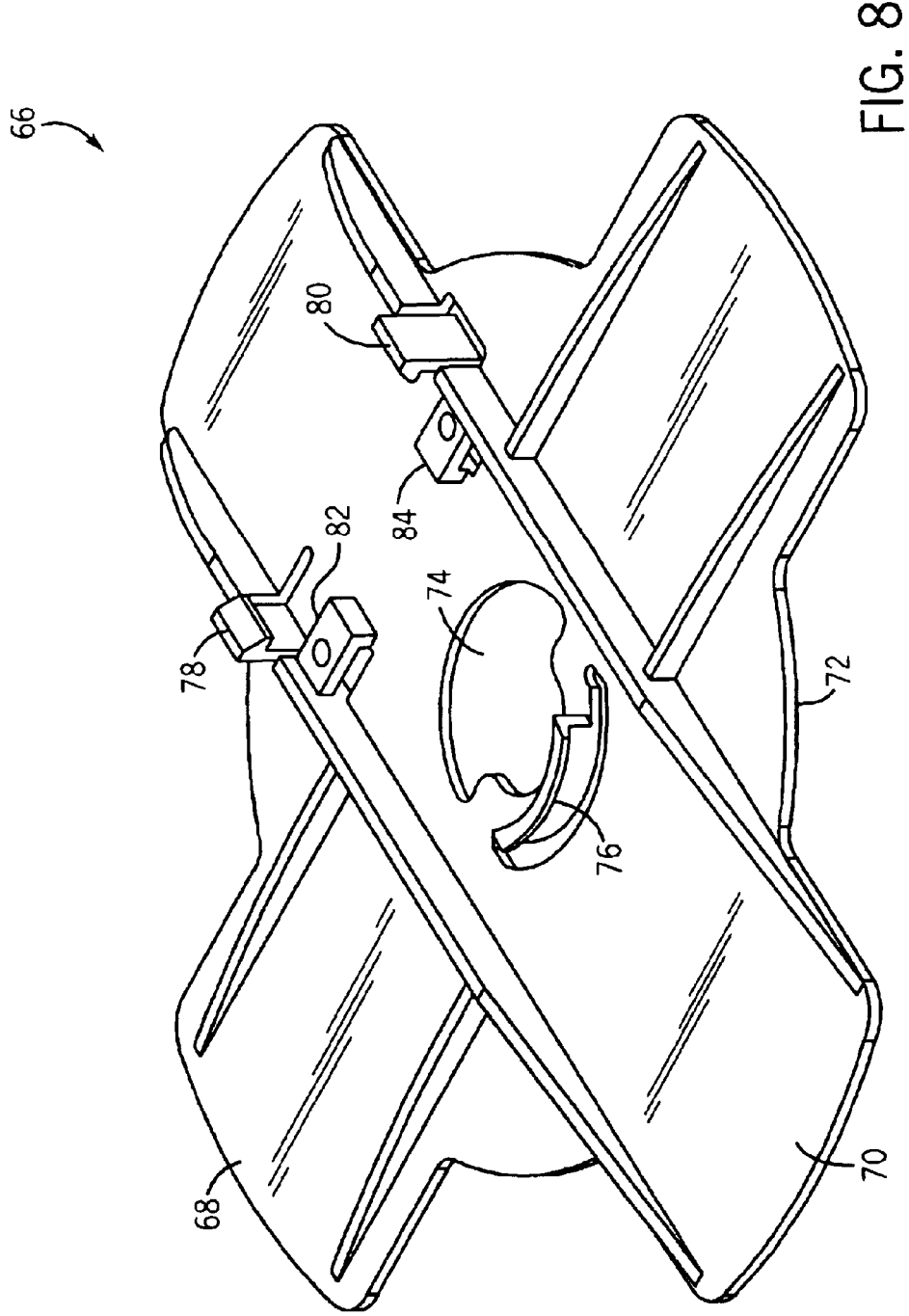
FIG. 8 is a perspective view of the cut out tool sub-base.

The hand-held power tool 31, in conjunction with the bit 35, can be used with the bases or guide members that are conventionally available for such hand-held power tools to form the recess or opening 32. However, an optional improvement upon these conventional bases is the sub-base 66 seen in FIGS. 6–8, which is particularly suited for use with the Roto Zip® cut-out tool. As seen here, the sub-base 66 comprises a pair of legs 68 and 70 which are perpendicular to one another to create an X-shape which is superimposed on a circular base 72. The sub-base 66 has a central aperture 74 through which the bit 35 is intended to be selectively extended and retracted. Adjacent to the central aperture 74 is an upwardly extending mounting tab 76 which is adapted to cooperate with a pair of opposed rear mounting tabs 78, 80 for selectively snap-fitting to the bottom of the plunge router 33 for the cut-out tool 31. These tabs cooperate with the base of the plunge router 33 so that the sub-base 66 can be selectively snap-fit on to the base of the plunge router 33. Another pair of tabs 82, 84 are also provided in the base as an alternative to the snap-fit tabs 78 and 80. Suitable screws or other fasteners can be inserted through the mounting tabs 82, 84 in order to secure the sub-base 66 to the base of the plunge router 33. According to various alternative embodiments, the sub-base may include one or more of a variety of different structures that are suitable for allowing the sub-base to be coupled to the Dremel® rotary tool (or a plunge router configured to be used with such a tool) or one or more of a variety of other hand-held power tools and/or the corresponding attachments or components for such tools.

Figure 6:
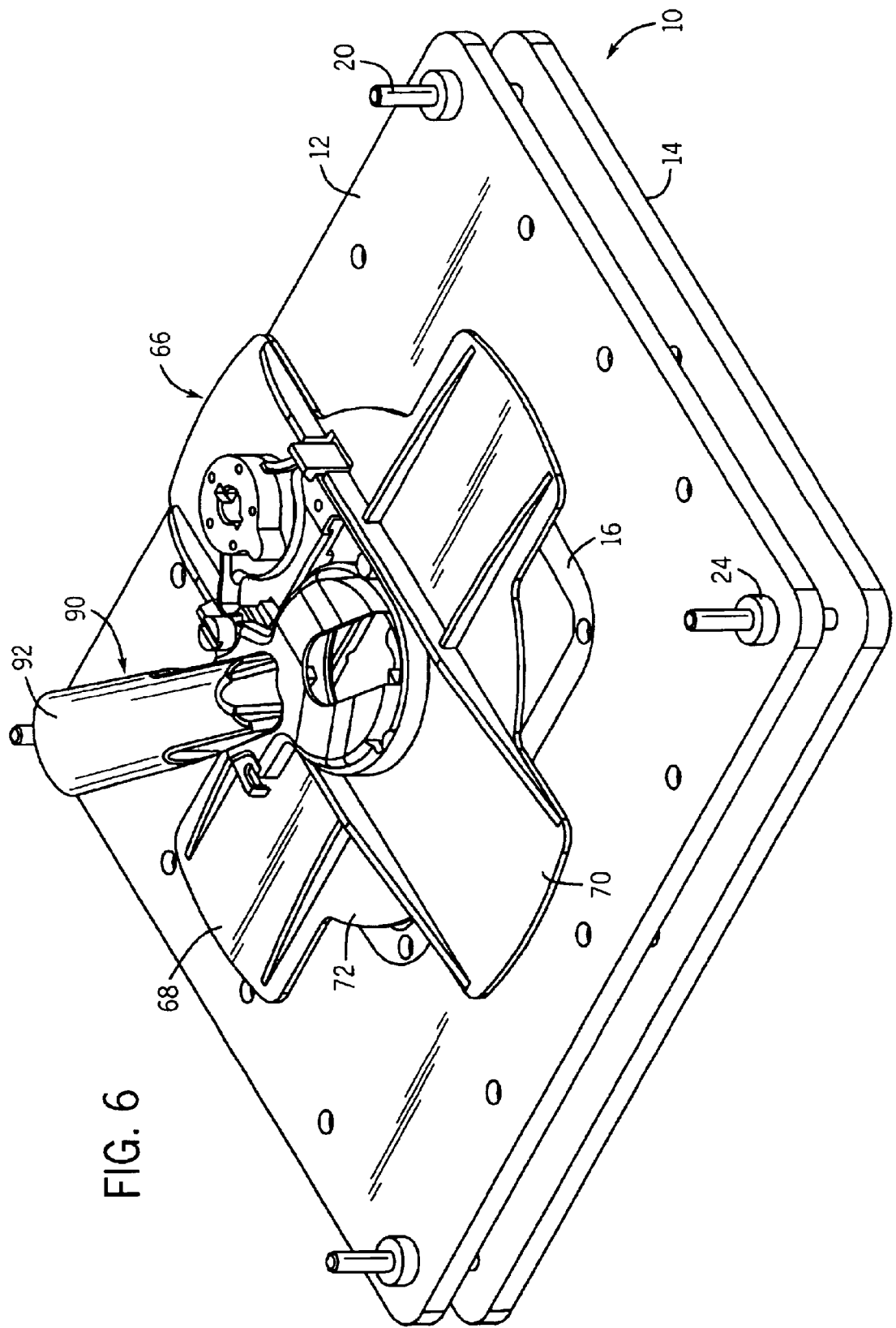
FIG. 6 is a perspective view of a preferred embodiment of a tool sub-base and dust collector mounted on top of the jig assembly of FIG. 1.

As is described more fully in P.C.T. Patent Application Publication No. WO-02/04182, a vacuum nozzle adapter 90 may also be snap-fit to the base of the plunge router 33. Therefore, as depicted in FIG. 6, the vacuum nozzle adapter 90 can be positioned immediately above the central aperture 74 of the sub-base 66 and the bit 35 extending therethrough. A vacuum hose (not shown) is adapted to be mounted to the hose connector 92 of the adapter 90. Therefore, when the user is forming a recess or opening in a piece of wood or other suitable work piece, the vacuum can be applied to the vacuum nozzle adapter to remove the dust generated by the bit 35 as the bit 35 is forming the recess or opening. The simultaneous removal of the dust can be important in providing the user with a clear field of view of the work piece and jig assembly.

The particular X-shaped contour of the sub-base 66 is intentional. This configuration is ideally suited for use when the top plate 12 is mounted to the bottom plate 14. When the sub-base 66 is aligned as depicted in FIG. 6, the user can move the tool 31 around the entirety of the central opening 28 of the top plate 12 without interference between the sub-base 66 and the bolts 20 and nuts 24 extending through the top plate 12. The accommodation for the mounting nuts 24 and bolts 20 is achieved while also simultaneously creating a very large support surface for the tool 31, which is beneficial for the stability of the tool 31 during use.

According to various alternative embodiments, other sub-bases may be used that are configured to be used with one or more of a variety of other hand-held power tools. According to other alternative embodiments, the sub-base may be configured to couple directly to the hand-held power tool. According to still other alternative embodiments, the jig assembly may be used without a sub-base and/or a plunge routing attachment.

According to one exemplary embodiment, the recess or opening 32 in the work piece makes up part of a picture frame assembly 100. FIGS. 9–15 depict the completed structure of the picture frame assembly 100. As seen in FIG. 12, the preferred embodiment of the picture frame assembly 100 comprises the work piece 18 having the picture frame opening 32 cut therein. A photograph 102 or other suitable display item is dimensioned to be received inside the picture frame opening 32. A cover 104 is preferably positioned on top of the photograph 102 inside the picture frame opening 32. Finally, the cover 104 and photograph 102 are retained inside the picture frame opening 32 by a fillet or retaining ring 106. The cover 104 can have a plurality of outwardly extending tabs 107 formed thereon to help hold it in place, or merely can be cut to match the size of the opening. When a cover 104 having tabs 107 formed thereon is used, a retaining ring 106 is not required in the completed picture frame assembly 100 and vice versa.

Figure 9:
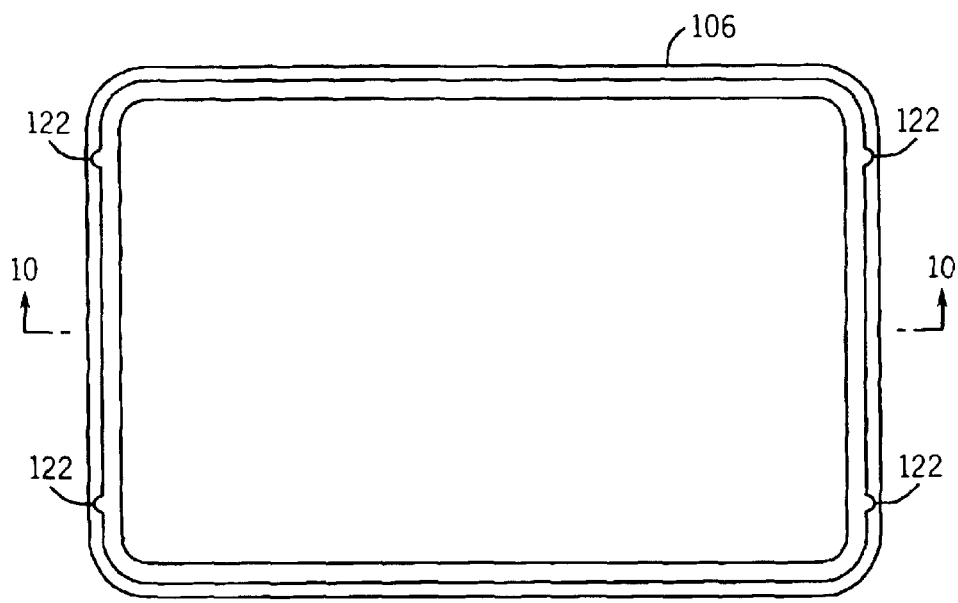
FIG. 9 is a bottom view of a preferred embodiment of a picture frame fillet.
Figure 10:
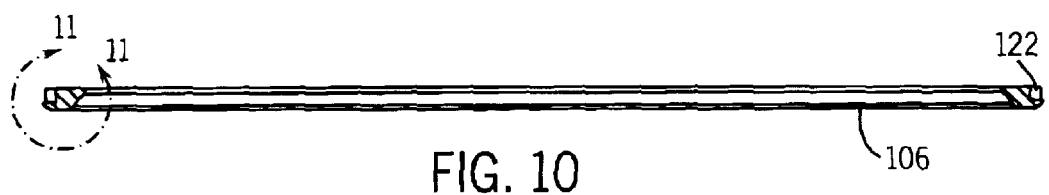
FIG. 10 is a sectional view of the fillet taken along lines 10—10 of FIG. 9.
Figure 11:
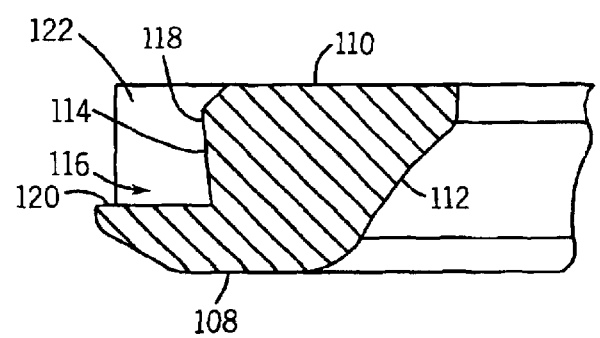
FIG. 11 is a detail view of a portion of FIG. 10.
Figure 12:
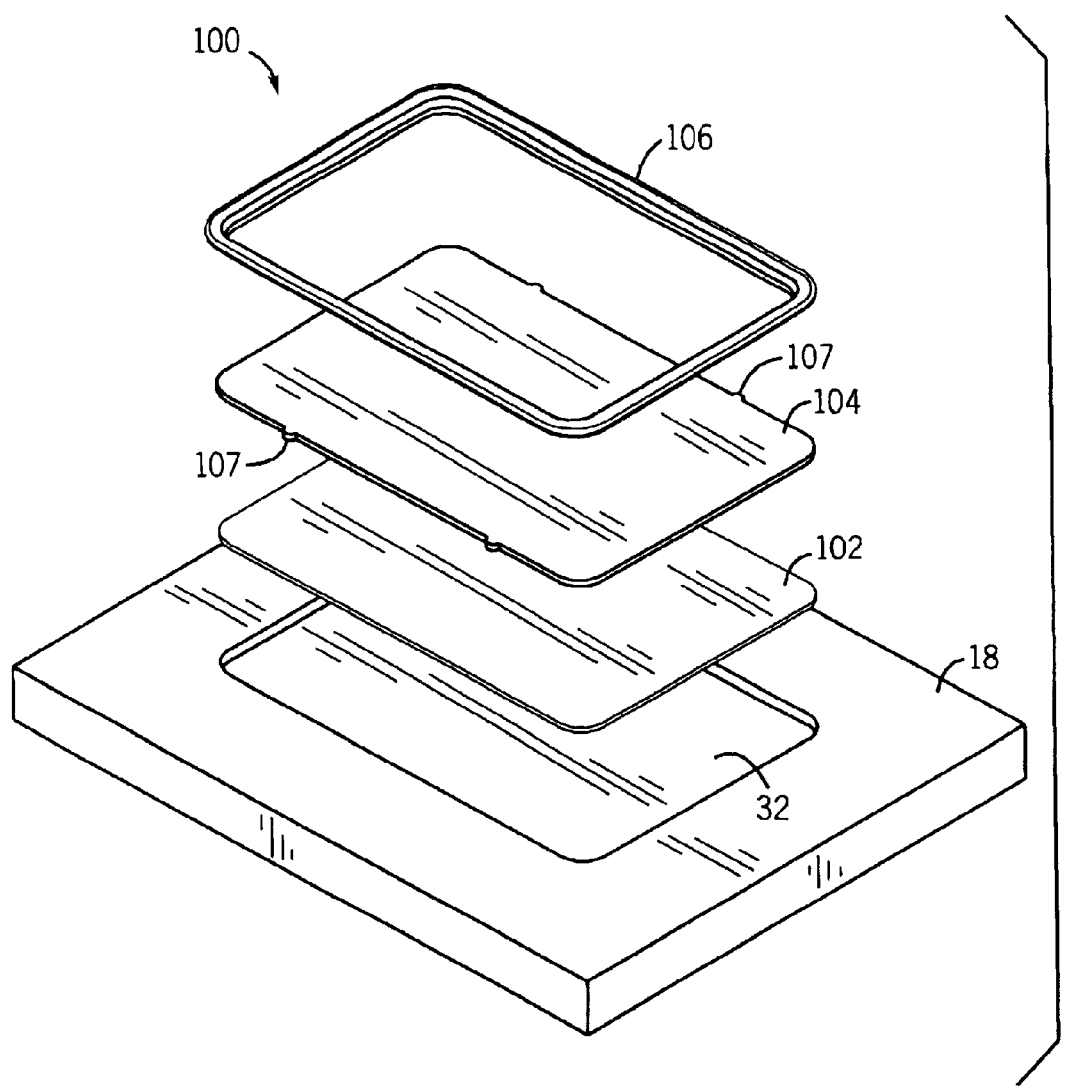
FIG. 12 is an exploded perspective view of a completed picture frame assembly according to the invention.
Figure 13:
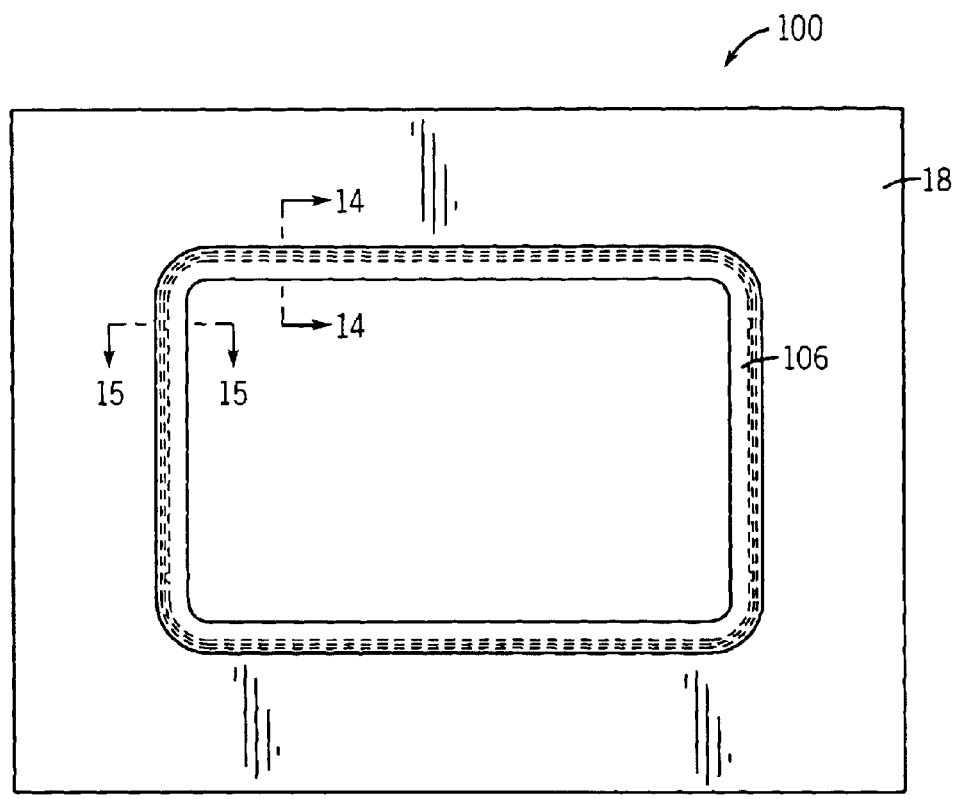
FIG. 13 is a top elevational view of an assembled picture frame assembly according to the invention.
Figure 14:
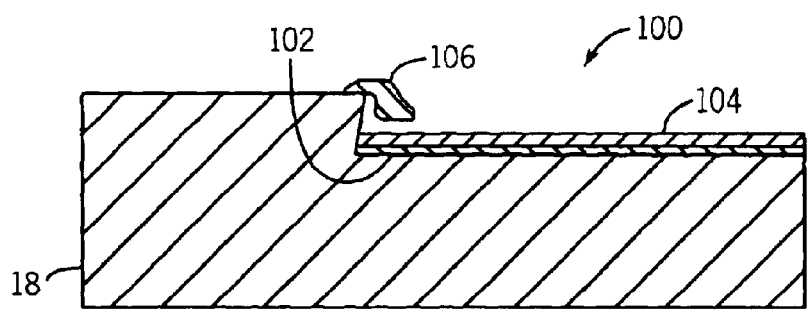
FIG. 14 is a cross sectional view of the picture frame assembly taken along lines 14—14 of FIG. 13.
Figure 15:
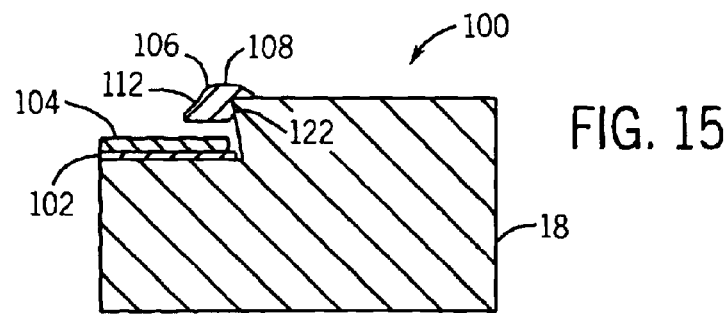
FIG. 15 is a cross sectional view of the picture frame assembly taken along lines 15—15 of FIG. 13.
Figure 19:
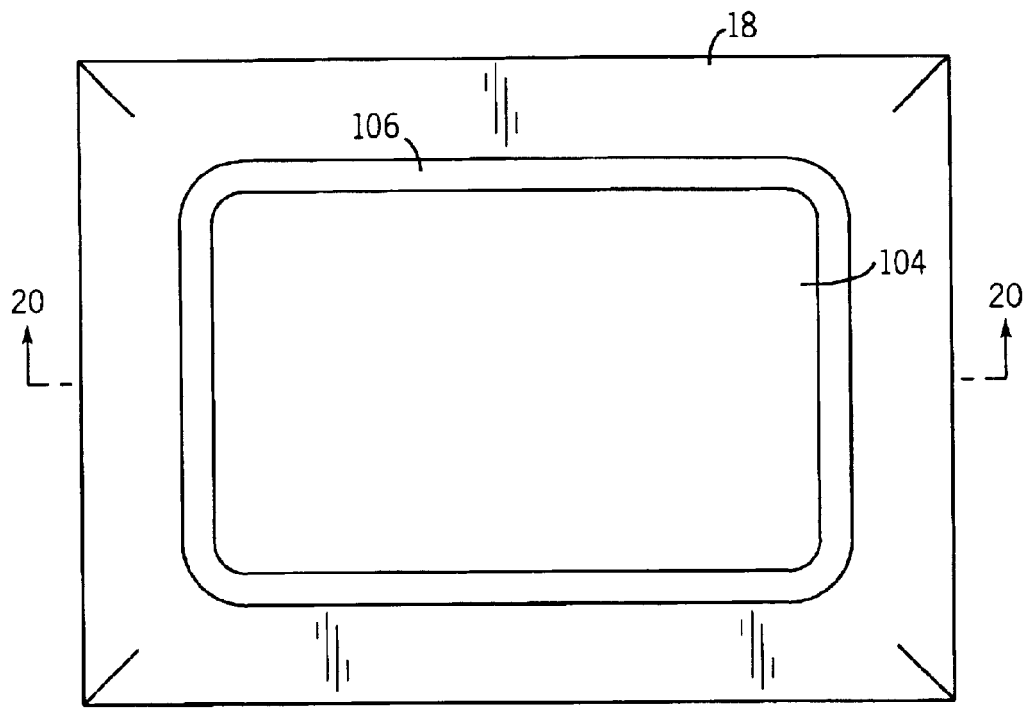
FIG. 19 is a top view of an assembled picture frame.
Figure 20:
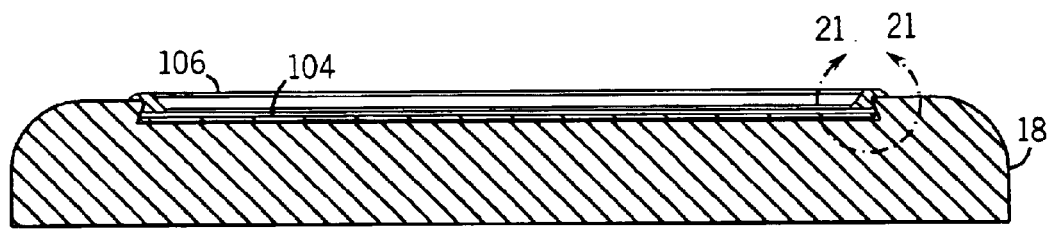
FIG. 20 is a cross sectional view of the picture frame of FIG. 19 taken along lines 20—20 of FIG. 19.
Figure 21:
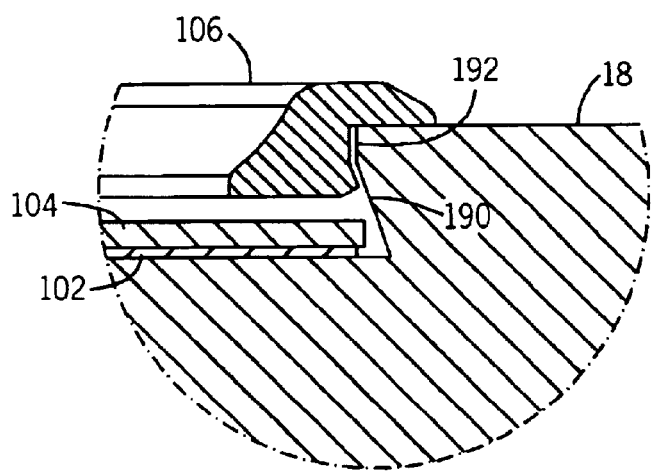
FIG. 21 is an exploded view of a portion of the picture frame seen in FIG. 20.

As seen in FIGS. 9–11, the retaining ring 106 is configured substantially the same as the perimeter of the picture frame opening 32. The retaining ring 106 has a top surface 108 and an opposed bottom surface 110. The inside edge 112 of the ring 106 is configured to create a desirable presentation surface. In one embodiment, the inside edge 112 tapers radially inwardly from the top surface 108 to the bottom surface 110. This taper creates a fillet effect for the retaining ring 106. While the tapering or fillet effect is the preferred configuration, other shapes can be used, such as a flat surface which is substantially perpendicular to the surface of the picture frame, or alternatively, an under-cut in which the inside edge tapers outwardly from the top surface 108 to the bottom surface 110.

The outside edge 114 of the ring 106 incorporates a shoulder 116 which is defined by a first leg 118 and a second leg 120. As seen in FIG. 11, the first leg 118 is substantially perpendicular to the bottom surface 110 of the retaining ring and the second leg 120 is substantially parallel to the bottom surface 110. The shoulder 116 is dimensioned to receive the corner of the picture frame opening 32. A plurality of retaining tabs 122 are integrally formed into the outside edge 114 as the preferred means for securing the retaining ring 106 to the picture frame opening 32. As seen in one embodiment in FIG. 9, two pairs of retaining tabs 122 are formed on opposing sides of the retaining ring 106. The tabs 122 extend radially outwardly from the outside edge 114 of the ring 106 but only for a short distance.

As seen in FIGS. 16–18, a preferred embodiment of a router bit 130 used to create the desired contour of the picture frame opening 32 is a 4-fluted "stagger tooth" bit that creates an under-cut in the sidewall of the work piece 18. The router bit 130 includes a shaft 136, a bearing 134, and a cutting portion 131. The shaft 136 includes a proximal end which is dimensioned to be received inside a collet (not shown) of tool 31 and a distal end to which the cutting portion 131 is coupled. In the preferred embodiment, the shaft 136 has a diameter of 3/16 inches. However, the bit can be manufactured with a shaft having a variety of diameters including 1/4, 1/8 or 3/8 inches depending upon the application and also depending upon the diameter of the cutting surfaces of the bit.

A stop 138 is provided on the shaft 136 immediately adjacent to the bearing 134. The stop 138 preferably has a diameter slightly larger than that of the shaft 136 but substantially smaller than the diameter of the bearing 134. The axial positioning of the stop 138 is dimensioned to allow the user to quickly and easily position the router bit 130 in the power tool 31 to quickly and easily create the desired depth of cut. In forming a recess for a picture frame opening, the desired depth of cut is 3/16 of an inch. In practice, the user inserts the shaft 136 into the collet of the tool 31 a sufficient distance until the terminal end 139 of the stop 138 abuts the outside end of the collet (not shown). At this point, the user then tightens the collet via the shaft locking nut to securely grasp the shaft 136 of the bit 130. In this fully inserted position, the depth of the recess cut in the work piece 18 is ideally suited for receipt of the photograph 102 or other display item, cover 104 and retaining ring 106. However, if desired, the user can make a deeper recess in the work piece 18 by extending the bit 130 from the tool 31 the desired distance.

The bearing 134 is coupled to the shaft between the proximal end and the distal end of the shaft and immediately adjacent to the stop 138. The bearing 134 is a conventional ball bearing which is press-fit onto the router bit 130. In use, the bearing 134 of the router bit 130 is positioned along the router bit shaft 136 so that the bearing 134 will abut the inside edge of the central opening 28 or the opening of the insert guide 16 when the router bit 130 is maneuvered adjacent to the edge. The bearing 134 helps to ensure that the cutting edge of the router bit 130 does not inadvertently damage the components of the jig assembly 10.

As seen in FIGS. 16–18, the preferred embodiment of the cutting portion 131 of router bit 130 includes four flutes equally spaced about the longitudinal axis of the shaft 136. Two of the flutes, the first and second axial flutes, 144 and 146, have cutting edges 148, 150, respectively provided on the outside edge thereof. These cutting edges are equally spaced radially outwardly from the longitudinal axis of the shaft 136 and are diametrically opposed to one another. The remaining two flutes of the preferred embodiment of the router bit 130 comprise first and second angled flutes 154, 156, respectively which are equally spaced from the longitudinal axis of the shaft 136 and are diametrically opposed to one another. The first and second angled flutes 154, 156 include cutting edges 158, 160, respectively. Preferably, the angle between the longitudinal axis of the shaft 136 and the cutting edges 158, 160 is 20 degrees. However, any angle which creates an undercut adequate to retain the photograph or other display item and/or the retaining ring 106 is adequate. Testing has shown that angles in the range of 10 to 90 degrees provide an acceptable undercut.

As seen in FIGS. 16–21, the cutting edges 158 and 160 of the angled flutes 154, 156 extend radially outwardly from the longitudinal axis of the shaft 136 a greater distance than the cutting edges of 148, 150 of the first and second axial flutes 144, 146. With this structure, the side wall of the recess 32 formed by the preferred embodiment of the router bit 130 will have an undercut 190 formed at the base of the side wall and a substantially vertical portion 192 intermediate the undercut 190 and the exterior surface of the work piece 18. Testing has shown that the combination of the angled flutes 154, 156 and the axial flutes 144, 146 creates both the desired undercut and also a smooth, finished edge at the uppermost corner of the side wall. In the preferred embodiment, the depth of the undercut formed in the side wall is approximately 1/8 inch.

For the particular cutting diameter created by the router bit 130, testing has shown that a 4-flute bit provides a smooth and efficient cut in the work piece 18. With this structure, multiple flutes are in contact with the work piece and material being cut as the router bit 130 traverses the work piece 18. In other words, as the user moves the router bit 130 laterally through and across the work piece 18, at least two of the four flutes of the bit 130 are in contact with the work piece. As the router bit 130 rotates and is moved through the work piece, the number of flutes that are in contact with the work piece will alternate from three to two to three to two, etc. This creates an extremely stable cutting bit and minimizes any chatter or jumping occasionally encountered with some bits.

It is possible to create a 3-fluted router bit and still insure that multiple flutes are in contact with the work piece at any one point in time. When the three flutes are equally spaced about the diameter of the shaft, then the bit will alternate between two and one flute in contact with the work piece as the bit rotates in and through the work piece.

If the diameter of the cutting radius of the router bit were increased, then more flutes could easily be incorporated into the bit. Testing has shown that for the particular diameter of cut incorporated in the preferred embodiment of the bit, four is the ideal number of flutes.

The cutting edges 148, 150, 158 and 160 are responsible for removing the bulk of material from the work piece 18 in order to create the recess 32. However, in order to begin the creation of the recess 32, the cutting portion 131 of bit 130 must first be plunged into the work piece 18 similar to the cutting or plunging action of a drill bit. In order to accomplish this plunging action, it is necessary to incorporate cutting edges on the distal end of the bit 130. Through the use of a web-thinning detail, plunge cutting edges 164, 166 are formed on the distal end of the bit. The first plunge cutting edge 164 is formed by a recess or depression 170 formed in the end of the bit 130. Similarly, the second plunge cutting edge 166 is formed by a second depression 172 forming the end of the bit 130. As seen in FIG. 18, the axis of the first plunge cutting edge 164 is planar to the axis of the cutting edge 158 of the first angled flute 154. Similarly, the axis of the second plunge cutting edge 166 is substantially planar to the axis of the cutting edge 160 of the second angled flute 156. As the bit 130 rotates and is plunged into the surface of the work piece 18, these cutting edges 164, 166 cut and remove material to begin the creation of the recess 32.

In the preferred embodiment of the bit 130, the terminal or distal ends 176, 178 of the first and second angled flutes 154, 156 are the farthest extending axial extremes of the bit. Therefore, as the bit 130 is plunged into the work piece 18, the initial plunge cutting action is accomplished by the terminal ends 176, 178 of the first and second angled flutes 154, 156. As the bit 130 continues to be plunged into the work piece 18, the terminal or distal ends 180, 182 of the first and second axial flutes 144, 146 encounter the work piece 18 and begin removing material to create the recess 32. Simultaneously with the terminal ends 180, 182 of the first and second axial flutes 144, 146, the first and second plunge cutting edges 164, 166 also begin to contact the work piece 18 and remove shavings therefrom as the power tool 31 rotates the bit 130.

The concave (e.g., cupped, indented, depressed, sunken in, etc.) distal end of the preferred embodiment of the cutting portion 131 creates a highly stable bit as it rotates through the work piece 18 removing material. The primary cutting edge angle for the plunge cutting edges 164, 166 is −15 degrees (or 105 degrees relative to the longitudinal axis of the shaft 136) and these angles are formed on the terminal or distal ends of the angled flutes 154, 156. A primary cutting edge 186, 188 is also formed on a small portion of the first and second axial flutes 144, 146. Once again, testing has shown that the preferred angle for this cutting edge is −15 degrees (or 105 degrees relative to the longitudinal axis of the shaft 136). These angles are ideal for plunging into conventional wood materials such as pine, oak and other lumber products. As the material into which the bit 130 will be plunged changes, the relative angles of these primary cutting edges may also need to change. Depending upon the material, the primary cutting edge angle could vary between +10 degrees to −30 degrees (or between 80 and 120 degrees relative to the longitudinal axis of the shaft 136). The hardness and fiber structure of the material being cut will determine the optimal angle of the primary cutting edge.

Figure 24:
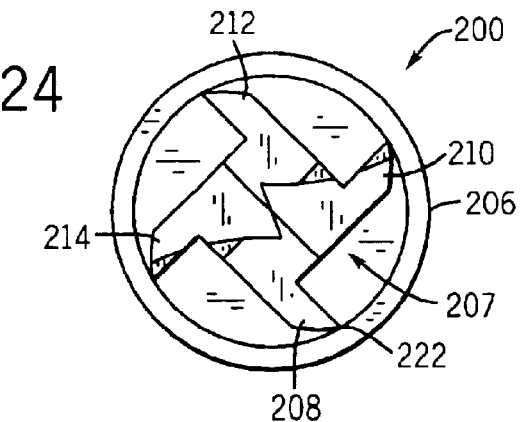
FIG. 24 is a top view of the router bit of FIG. 22.
Figure 22:
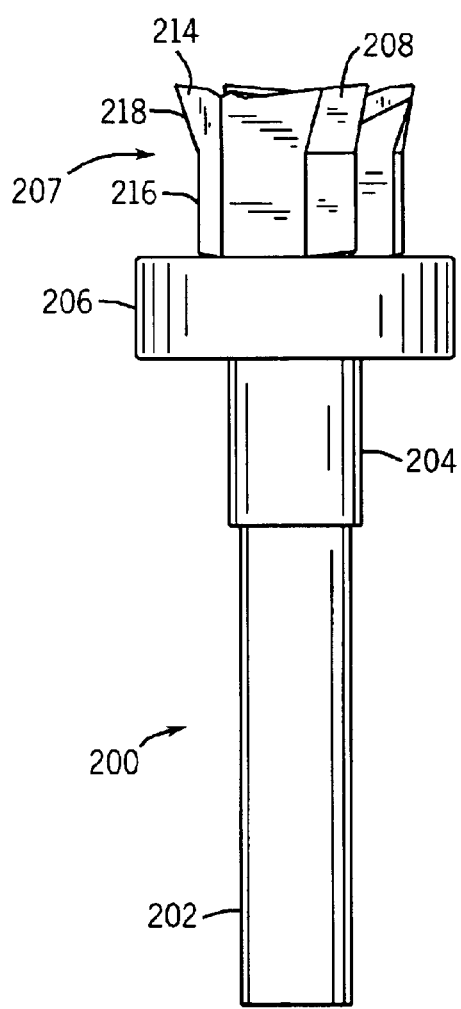
FIG. 22 is a front elevational view of a second embodiment of a router bit.
Figure 23:
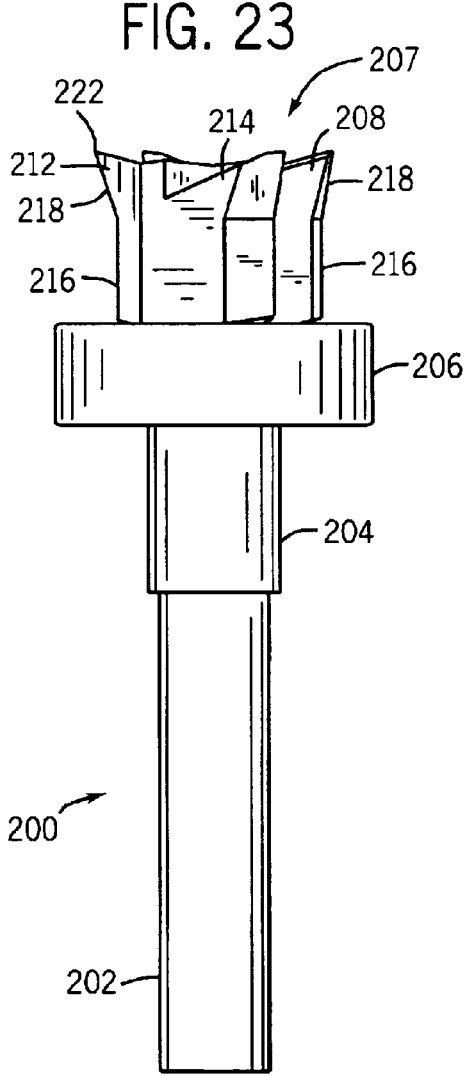
FIG. 23 is a side elevational view of the router bit of FIG. 22.

An alternative embodiment of the router bit is shown in FIGS. 22–24. This embodiment of the router bit 200 is similar to the first embodiment in that it includes a shaft 202, a stop 204 formed on the shaft 202, a bearing 206 pressed fit onto the shaft, and a cutting portion 207. Cutting portion 207 similarly includes four equally spaced and diametrically imposed flutes 208, 210, 212 and 214; however, the particular geometry of the flutes of this embodiment differ from that in the preferred embodiment. Each flute includes a compound cutting edge incorporating an axial cutting edge 216 and an angled cutting edge 218. Similar to the first embodiment, the axial cutting edge 216 forms the substantially vertical portion 192 of the side wall of the recess 32 and the angled cutting edge 218 forms the undercut 190 of the recess 32 (see FIG. 21). Similar to the first embodiment, the second embodiment includes a pair of plunge cutting edges formed by appropriate depressions on the distal end of the cutting portion 207 through a web thinning detail.

However, in this embodiment, the terminal or distal end 222 of each of the four flutes extends to the same axial distance. Therefore, as the router bit 200 is plunged into the work piece 18, all four of the terminal ends 222 of the flutes will simultaneously contact the work piece 18.

The work piece to be cut will often times determine many features of the structure and composition of the bit. For the intended uses in wood, applicant has found that the bit can be formed from M1 tool steel. Other acceptable alternatives include M2 or M42 tool steel once again depending upon the cutting application. Still another alternative would be a carbide steel composition for the bit. The bits can be formed by a conventional machining process where the entire structure of the bit, with the exception of the bearing, is machined from round tool steel stock. Alternatively, the bits, excluding the bearing, can be formed by a casting or an investment casting process and then subjected to a finish grinding and polishing operation.

While the preferred embodiment of the router bit 130 uses a multiple contoured cutting edge, experience has shown that a conventional dove-tail router bit, or other suitable bits 35, could also be used in forming an acceptable undercut for the picture frame opening 32. The dove-tail router bit creates the desired undercut in the work piece, but does not create as clean of an upper surface for the picture frame opening 32 as the contoured router bit 130 provides.

In assembling the picture frame, the insert guides or top plate 12 can be used to cut the photograph 102 and cover 104 to the desired shape. For example, if the user were creating a heart-shaped picture frame opening, the user would position the heart-shaped guide 60 on top of the photograph 102 and then using a sharp knife or razor blade, would then cut the photograph 102 along the inside edge of the heart-shaped opening in guide 60. Once again, by creating the insert guides out of a clear material, the user can easily see and frame the image or portion of the photograph 102 which will ultimately be positioned inside the picture frame. A similar process can be used to cut the cover 104. Because of the under-cut created by the bit 35 (which may be the bit 130, the bit 200, or other suitable bit) in forming the picture frame opening 32, the actual size of the picture frame opening 32 may be slightly larger than the photograph 102 and cover 104. However, experience has shown that the retaining ring 106 covers the entire edge of the photograph 102 and cover 104 to both adequately retain the photograph 102 and cover 104 therein and also create a desirable, finished appearance.

According to other exemplary embodiments, the jig assembly may be used with one or more of a variety of different cutting bits and hand-held power tools to create a variety of different recesses, engravings, inscriptions, carvings, cuttings, or openings in a work piece. For example, a conventional router bit may be used to create a recess in a work piece that has tapered, rounded, beveled, or straight sides. To prevent the bit from removing material from the insert, top plate, or other components of the jig assembly, a bushing or tube may be used (as an attachment to a hand-held power tool or as part of a plunge router attachment, for example) that substantially surrounds at least a portion of the bit to reduce the likelihood that the bit will contact any part of the jig assembly. Such a bushing or tube serves a function similar to that served by the bearing 134 on bit 130.

The construction and arrangement of the elements of the jig assembly and cutting bits as shown in the preferred and other exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.)

without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials in any of a wide variety of colors, textures and combinations. The order or sequence of any process or method steps may be varied or re-sequenced according to alternative embodiments. Other substitutions, modifications, changes and omissions may be made in the design, operating conditions and arrangement of the preferred and other exemplary embodiments without departing from the scope of the present invention.

What is claimed is:

1. A jig assembly for use with a work piece and a hand-held power tool including a cutting bit, the jig assembly comprising:
   a first member having a first opening and configured to be positioned adjacent a first side of the work piece; and
   at least one insert configured to fit within the first opening in the first member and including a second opening;
   wherein at least one of the first opening and second opening is configured to allow a portion of the hand-held power tool to pass therethrough to contact the work piece and to act as a guide for the hand-held power tool as it removes material from the work piece;
   wherein the at least one insert includes mounting apertures configured to receive fasteners for coupling the at least one insert to the work piece; and
   wherein at least one of the mounting apertures of the at least one insert includes a counterbore.

2. The jig assembly of claim 1, further comprising a second member located adjacent a second side of the work piece.

3. The jig assembly of claim 2, wherein the first member and the second member are coupled together so that the work piece is positioned intermediate the first and second members.

4. The jig assembly of claim 3, wherein the first member and the second member are coupled together with fasteners.

5. The jig assembly of claim 4, wherein the fasteners are bolts and nuts.

6. The jig assembly of claim 5, wherein the first member includes apertures configured to receive the bolts.

7. The jig assembly of claim 2, further comprising a pad coupled to at least one of the first and second members and configured to contact the work piece.

8. The jig assembly of claim 7, wherein the pad is a rubber material.

9. The jig assembly of claim 8, wherein the rubber material is neoprene.

10. The jig assembly of claim 1, wherein the first member is substantially transparent.

11. The jig assembly of claim 10, wherein the first member is formed from polycarbonate.

12. The jig assembly of claim 1, wherein the first member includes alignment lines.

13. The jig assembly of claim 1, wherein the size of the first opening is sufficient to allow the hand-held power tool to create a 5×7 inch recess in the work piece.

14. The jig assembly of claim 1, wherein the first member includes mounting apertures configured to receive fasteners for coupling the first member to the work piece.

15. The jig assembly of claim 1, wherein the at least one insert is transparent.

16. The jig assembly of claim 15, wherein the at least one insert is formed from polycarbonate.

17. The jig assembly of claim 1, wherein the at least one insert includes a shoulder extending outwardly from an outer edge of the at least one insert.

18. The jig assembly of claim 17, wherein the first member includes a recess proximate the first opening configured to receive the shoulder of the at least one insert.

19. The jig assembly of claim 1, wherein the at least one insert includes alignment lines.

20. The jig assembly of claim 1, wherein a first of the at least one insert includes an opening having a first shape and a second of the at least one insert includes an opening having a second shape.

21. The jig assembly of claim 1, wherein the shape of the opening of the at least one insert is one of square, rectangular, circular, oval, triangular, heart-shaped, star-shaped, moon-shaped, flag-shaped, arrow-shaped, letter-shaped, number-shaped, or symbol-shaped.

22. The jig assembly of claim 1, wherein the at least one insert includes a third opening.

23. The jig assembly of claim 1, further comprising a sub-base configured to couple to and support the hand-held power tool as the tool is maneuvered across the first member.

24. The jig assembly of claim 23, wherein the sub-base is substantially planar and comprises a first leg and a second leg arranged substantially perpendicular to and co-planar with one another.

25. The jig assembly of claim 24, wherein the sub-base further comprises a circular base proximate the intersection of the first leg and the second leg and substantially co-planar with the first and second legs.

26. The jig assembly of claim 25, wherein the sub-base includes an opening located near the center of the circular base configured to allow at least a portion of the hand-held power tool to pass therethrough.

27. The jig assembly of claim 26, wherein the sub-base further comprises mounting tabs configured to couple the sub-base to the hand-held power tool.

28. The jig assembly of claim 1, wherein the workpiece is a part of a picture frame assembly, the picture frame assembly having a retainer ring coupled thereto.

* * * * *